United States Patent
Brandt et al.

(10) Patent No.: US 7,469,175 B2
(45) Date of Patent: Dec. 23, 2008

(54) ARRANGEMENT AND METHOD FOR CALCULATING THE CHASSIS HEIGHT AT A VEHICLE

(75) Inventors: Per-Olov Brandt, Kållered (SE); Bengt Terborn, Olofstorp (SE)

(73) Assignee: Volvo Lastvagnar AB, Gothenborg (SE)

( * ) Notice: Subject to any disclaimer, the term of this patent is extended or adjusted under 35 U.S.C. 154(b) by 0 days.

(21) Appl. No.: 11/611,466

(22) Filed: Dec. 15, 2006

(65) Prior Publication Data

US 2007/0096406 A1 May 3, 2007

Related U.S. Application Data

(63) Continuation of application No. PCT/SE2005/000857, filed on Jun. 7, 2005.

(30) Foreign Application Priority Data

Jun. 15, 2004 (SE) .................................... 0401556

(51) Int. Cl.
G06F 7/00 (2006.01)
B60P 1/00 (2006.01)
B60S 9/00 (2006.01)

(52) U.S. Cl. .............................. 701/36; 701/37; 701/38; 701/49; 280/6.159; 280/6.153; 280/6.15; 280/5.513; 280/6.151; 280/5.515; 280/6.154; 414/426; 414/427

(58) Field of Classification Search .................. 280/5, 280/6, 5.513, 5.514, 6.15, 6.151, 6.153–6.157, 280/6.159; 701/37, 36, 38, 39, 49; 414/426, 414/427

See application file for complete search history.

(56) References Cited

U.S. PATENT DOCUMENTS

| | | | | | |
|---|---|---|---|---|---|
| 4,647,068 | A | * | 3/1987 | Asami et al. | 280/5.517 |
| RE33,601 | E | * | 6/1991 | Asami et al. | 280/5.503 |
| RE33,626 | E | * | 7/1991 | Asami et al. | 280/5.517 |
| 5,124,917 | A | * | 6/1992 | Kanamori | 701/37 |
| 5,273,308 | A | * | 12/1993 | Griffiths | 280/6.151 |
| 5,344,189 | A | * | 9/1994 | Tanaka et al. | 280/6.152 |
| 5,684,698 | A | * | 11/1997 | Fujii et al. | 701/38 |
| 5,890,721 | A | * | 4/1999 | Schneider et al. | 280/6.153 |
| 6,098,994 | A | * | 8/2000 | Kunishima et al. | 280/5.514 |
| 6,161,845 | A | * | 12/2000 | Shono et al. | 280/6.15 |
| 6,168,171 | B1 | * | 1/2001 | Shono et al. | 280/5.507 |
| 6,431,557 | B1 | * | 8/2002 | Terborn et al. | 280/6.15 |

(Continued)

FOREIGN PATENT DOCUMENTS

DE 280596 A1 7/1990

(Continued)

*Primary Examiner*—Khoi Tran
*Assistant Examiner*—Ian Jen
(74) *Attorney, Agent, or Firm*—Novak Druce + Quigg LLP

(57) ABSTRACT

Method and device for calculating chassis height of a vehicle that has at least three air-suspended wheel axles (2, 3, 4). The device includes a control unit and two level sensors (9, 10). The control unit detects the chassis height at the front axle (2) via a first level sensor (9) and at the forward rear axle (3) via a second level sensor (10), and the control unit calculates the chassis height at the rearmost wheel axle (4). An object of the disclosure is to protect the rear axle installation with as few level sensors as possible.

12 Claims, 2 Drawing Sheets

U.S. PATENT DOCUMENTS

| | | | |
|---|---|---|---|
| 6,832,143 B2 * | 12/2004 | Trudeau et al. | 701/37 |
| 6,918,600 B2 * | 7/2005 | Dodd et al. | 280/5.508 |
| 6,959,932 B2 * | 11/2005 | Svartz et al. | 280/5.514 |
| 6,983,201 B2 * | 1/2006 | Misawa | 701/37 |
| 7,104,547 B2 * | 9/2006 | Brookes et al. | 280/6.153 |
| 2002/0117345 A1 * | 8/2002 | Sztykiel et al. | 180/292 |
| 2003/0094775 A1 * | 5/2003 | Pivac | 280/6.154 |

FOREIGN PATENT DOCUMENTS

| | | |
|---|---|---|
| EP | 0300496 A2 | 1/1989 |
| EP | 0754577 A2 | 1/1997 |

* cited by examiner

ARRANGEMENT AND METHOD FOR CALCULATING THE CHASSIS HEIGHT AT A VEHICLE

CROSS-REFERENCE TO RELATED APPLICATIONS

The present application is a continuation patent application of International Application No. PCT/SE2005/000857 filed 7 Jun. 2005 which is published in English pursuant to Article 21(2) of the Patent Cooperation Treaty and which claims priority to Swedish Application No. 0401556-6 filed 15 Jun. 2004. Said applications are expressly incorporated herein by reference in their entirety.

FIELD

The present invention relates to a method and device for calculating the chassis height of a vehicle.

BACKGROUND

Heavy vehicles can be equipped with different types of spring arrangements for absorbing shocks caused by unevenness of road surfaces. Commonly occurring spring arrangements are either leaf springs or air springs. Combinations of these springs are also used; e.g., vehicles with a leaf-suspended front axle and one or more air-suspended rear axles. Air suspension results in a soft and shock-free ride both laden and unladen, with consequently good traveling comfort and less stress on chassis and tires.

Air-suspended vehicles are often equipped with manual or automatic level control. Automatic level control not only enables the vehicle to be kept on level even when unevenly laden but also enables the height of the vehicle to be kept constant irrespective of load. When the vehicle is standing still, its height may also be adjusted manually whereby the vehicle can be raised, lowered or caused to tilt forwards or rearwards; e.g., to adapt the vehicle to a loading dock for the purpose of loading or unloading.

Air suspensions typically include rubber bellows situated between the frame and the wheel axles. As the height of the chassis may change, the vehicle is equipped with at least one level sensor which detects the height between the frame and a wheel axle. One level sensor is sufficient for a vehicle with a leaf-suspended front axle and an air-suspended rear axle, but a vehicle with an air-suspended front axle and two air-suspended rear axles requires three level sensors to enable reliable monitoring of the air suspension system.

Heavy vehicles are commonly equipped with more than one rear axle. An arrangement with more than one rear axle is called a bogie, which may comprise two or three rear axles. The most common arrangement is a bogie with two rear axles comprising either two powered rear axles or one powered rear axle and an trailing or pusher axle. Vehicles with two powered rear axles are called 6×4 and vehicles with one powered rear axle and a trailing axle are called 6×2. A bogie may be designed in various ways depending inter alia on the intended load capacity.

When the longitudinal tilt of a vehicle with two rear axles and air suspension changes, it is important that the maximum permissible chassis height at each axle is not exceeded, i.e. that the distance between the frame and each axle does not exceed a maximum permissible value. If that value is exceeded, the axle installation is subjected to impermissible stressing which may result in mechanical damage. The axle installation is more or less sensitive to incorrect stressing, depending on the type of bogie. For example, an axle installation where the rear axle can be raised by a bogie lift may be sensitive to stressing in a wrong direction. Possible forms of damage are shock absorbers being pulled apart or damaged or the fastenings of the V-stay being incorrectly stressed.

Exceeding the maximum permissible chassis height may occur at the rear wheel axle if, for example, the whole vehicle is first raised to the maximum and the chassis height is thereafter reduced at the front axle to cause the vehicle to tilt forwards. The result is that the vehicle pivots about the forward rear axle, which means that the distance between the rearmost axle and the frame will increase, with consequent risk of the maximum permissible chassis height being exceeded at the rearmost axle. On vehicles with bogies, the stresses may be distributed among the wheel axles.

On a vehicle with a two-axle bogie it is usually the rearmost axle which can be relieved of stress. This entails having a level sensor on each axle in order to be able to monitor the distance between the frame and the wheel axles.

A disadvantage of using a level sensor for each axle is that the cost of each level sensor is high. As a level sensor for a heavy vehicle is subject to severe environmental effects, meeting the requirements is expensive. Another disadvantage is the need for the vehicle to comprise an extra installation which comprises various lever arms and stays and is therefore expensive and occupies space.

SUMMARY

The object of the invention is therefore to provide a device and a method for calculating chassis height of a vehicle with two or more rear axles as cost-effectively as possible.

The solution according to the invention is described in the characterizing part of claim 1 as regards the device and by the features of claim 8 as regards the method. The other claims comprise advantageous embodiments and further developments of the device according to the invention.

With a device for calculating chassis height of a vehicle which has at least three air-suspended wheel axles and comprises a control unit and two level sensors whereby the control unit detects the chassis height at the front axle via a first level sensor and at the forward rear axle via a second level sensor, the object of the invention is achieved by the control unit calculating the chassis height at the rearmost wheel axle.

The method according to the invention achieves the object by detecting the chassis height at the vehicle's foremost wheel axle and the vehicle's foremost rear wheel axle and thereafter calculating the chassis height at the vehicle's rearmost wheel axle.

This first embodiment of the device according to the invention for calculating chassis height of a vehicle makes it possible for the chassis height at each wheel axle to be detected without having a separate level sensor at each axle. The advantage of this is that fewer level sensors are needed and that installation space is freed.

In an advantageous first further development of the device according to the invention for calculating chassis height of a vehicle, the control unit limits the chassis height at the rearmost wheel axle to a predefined maximum value. The advantage of this is that damage to the rear axle installation can be prevented.

In an advantageous second further development of the device according to the invention for calculating chassis height of a vehicle, the control unit limits the chassis height at the front axle on the basis of the chassis height at the rearmost wheel axle. The advantage of this is that decrease of the chassis height at the forward wheel axle can be stopped before damage is caused to the rear axle installation.

In an advantageous third further development of the device according to the invention for calculating chassis height of a vehicle, the control unit reduces the chassis height at the forward rear axle when the chassis height at the rear axle decreases, with the result that the predefined maximum value at the rearmost wheel axle is not exceeded. The advantage of this is that reducing the chassis height at the forward rear axle can prevent damage to the rear axle installation.

In an advantageous fourth further development of the device according to the invention for calculating chassis height of a vehicle, the device is integrated in an electronically controlled air suspension (ECS) system existing in the vehicle. The advantage of this is that it is an easy and inexpensive way of simplifying and/or improving an existing installation on a vehicle.

BRIEF DESCRIPTION OF THE DRAWINGS

The invention is described below in more detail with reference to an example of an embodiment depicted in the attached drawings, in which.

DETAILED DESCRIPTION

The example described below of an embodiment of the invention with further developments is to be regarded merely as an example and in no way limiting the scope of protection of the claims.

Figure 1:
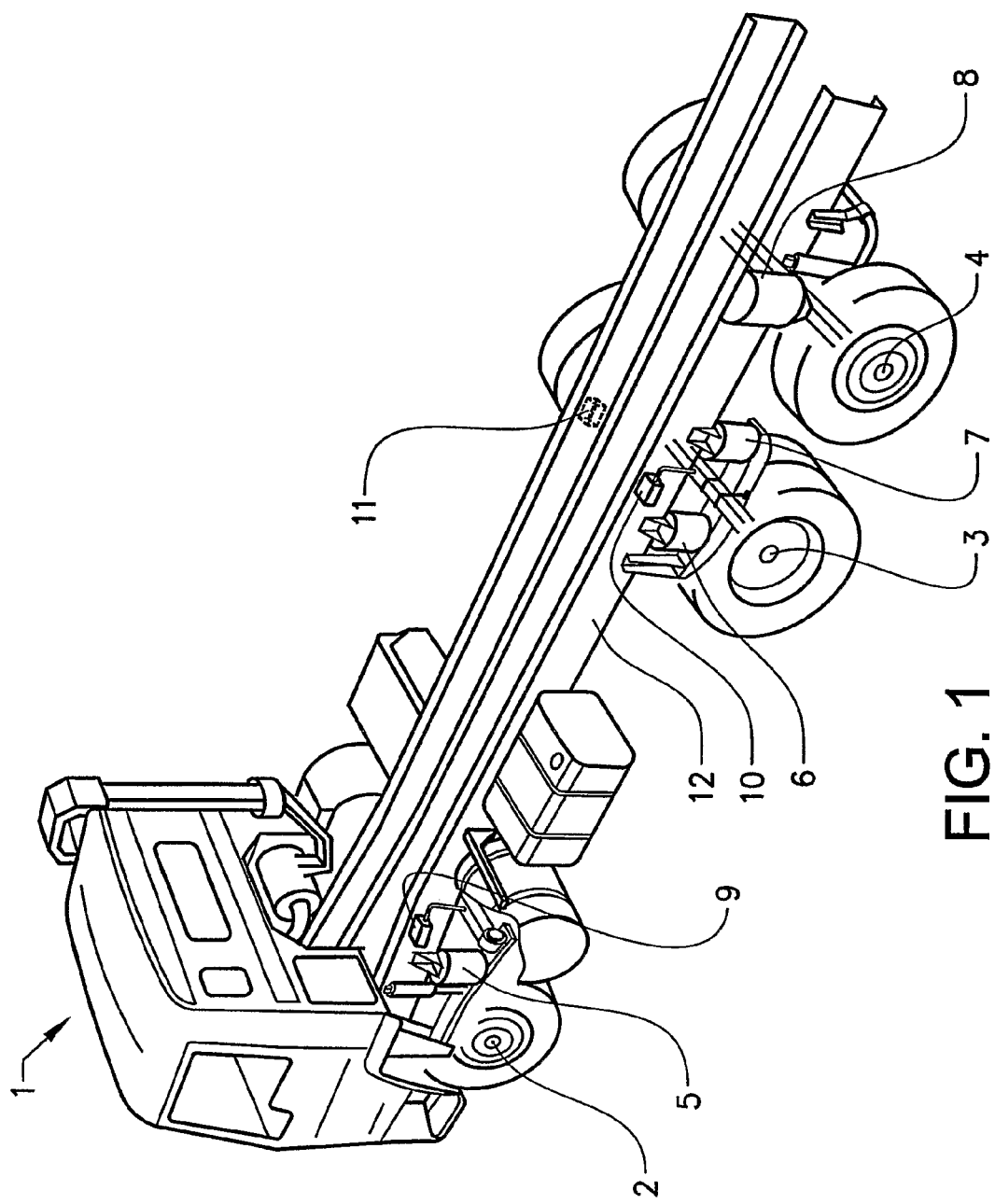
FIG. 1 depicts a vehicle with several rear axles.

FIG. 1 depicts a vehicle 1 with several rear axles according to the invention. The vehicle comprises a front axle 2, a forward rear axle 3 and a rearmost rear axle 4. In this example, each axle is suspended by air bellows 5, 6, 7, 8. In addition, the front axle 2 is provided with a level sensor 9 and the forward rear axle 3 is provided with two level sensors comprising a level sensor 10 on the left side and a level sensor 11 on the right side. The level sensor 9 measures the chassis height at the front axle, i.e. the distance between the front axle and the frame, the level sensor 10 measures the chassis height at the left portion of the forward rear axle, i.e. the distance between the left portion of the forward rear axle and the frame, and the level sensor 11 measures the chassis height at the right portion of the forward rear axle, i.e. the distance between the right portion of the forward rear axle and the frame. The level sensors 10 and 11 each measure at the position where the respective air bellows is fastened. The purpose of using two level sensors on the rear axle is to enable the vehicle's sideways tilt to be measured and hence adjusted, e.g. when the vehicle is uneven loaded.

The level sensors are fastened to the frame. A rotary potentiometer is often used as sensor element, but a rotating pulse sensor is also usable with advantage. The level sensors are each provided with a sensor arm connected to the respective wheel axle via a link arm. The length of the sensor arm adapts the relationship between the sensor element and the axle's movement in a vertical direction. Other types of level sensors, e.g. linear sensors or contactless sensors, are also conceivable.

When the vehicle rises or sinks, i.e. when air is put into or released from an air bellows, the distance between the wheel axle and the frame will change. This distance change causes the sensor arm of the level sensor to perform a rotation movement. This rotation movement is proportional to the distance change, which means that the distance change can be calculated from the rotation. The output signal of the sensor element is changed via the sensor arm. This change is detected by, for example, a control unit which can calculate the distance value concerned. The distance between the frame and a wheel axle is here referred to as the chassis height.

The sensor elements are connected to a unit; e.g., a control unit (not depicted), which converts each sensor's signals to a value corresponding to the chassis height at the respective wheel axle. This unit may either be a freestanding unit or be integrated in an existing control unit. With advantage, the unit is situated in the cab but it is also possible for it to be at any desired location on the vehicle. It is also possible to integrate a conversion function in the sensor so that the sensor's output signal is directly proportional to the chassis height.

The conversion to chassis height may be effected on a discrete analogue, digital analogue or wholly digital basis. In discrete analogue conversion, the signal processing is effected by discrete components. In digital analogue conversion, the analogue signal is converted to a digital signal which is processed by a processor. In wholly digital conversion in cases where the sensor is, for example, a rotating pulse sensor, the signal processing is effected by a processor without needing any prior conversion of the signal. The mode of conversion selected depends inter alia on the particular sensor used and the characteristics of the output signal. The signal processing performed by the conversion function may include inter alia compensation for signal linearity, compensation for outside temperature, low-pass filtering of signals, etc.

Figure 2:
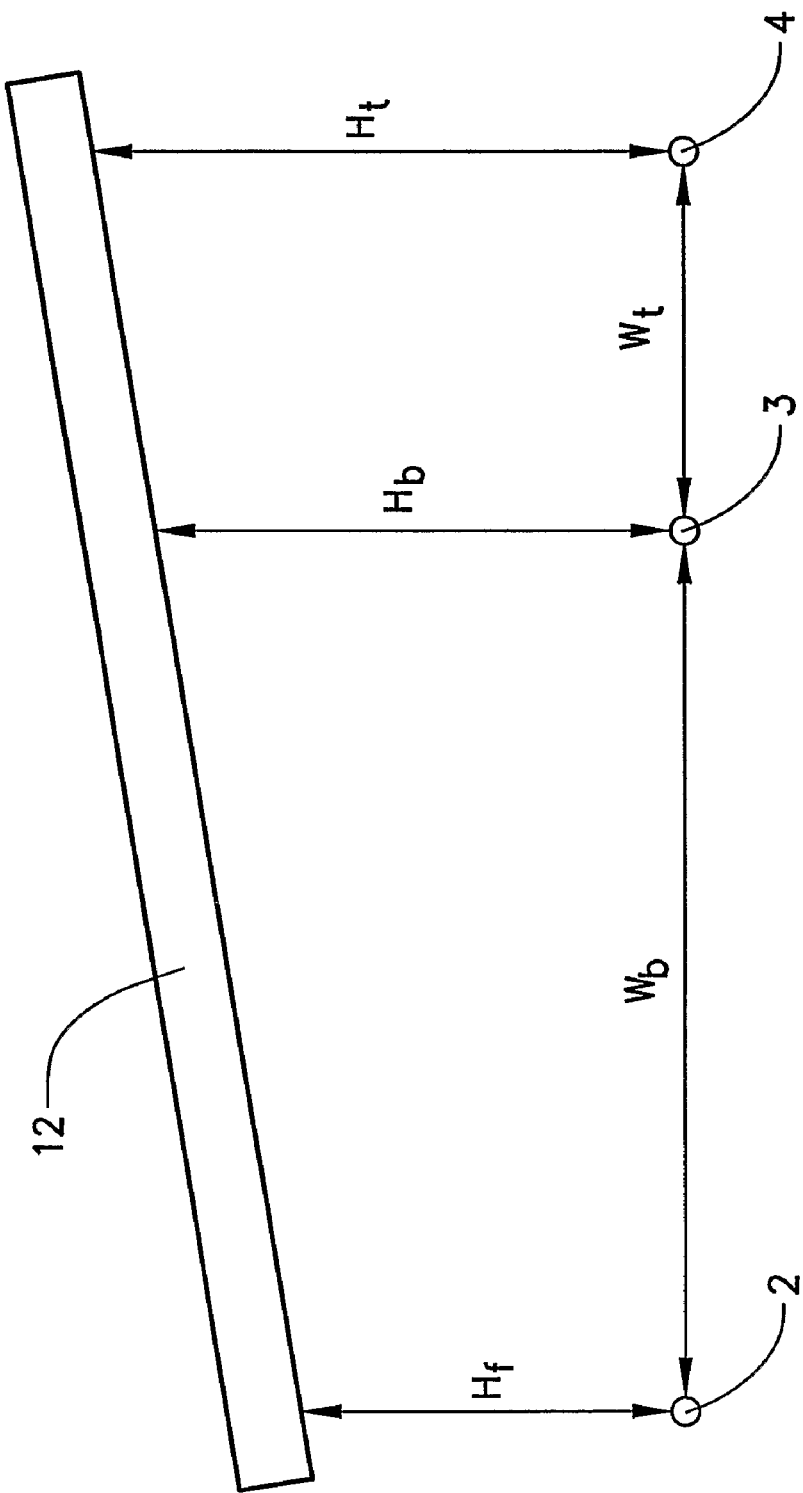
FIG. 2 depicts schematically an advantageous embodiment of the invention.

FIG. 2 is a schematic drawing of a model of the truck 1. The frame 12 is positioned on the front axle 2, the forward rear axle 3 and the rearmost rear axle 4. $H_f$ denotes the chassis height at the front axle, $H_b$ the chassis height at the forward rear axle and $H_t$ the chassis height at the rearmost rear axle. $W_b$ denotes the vehicle's wheelbase; i.e., the distance between the front axle and the forward rear axle, and $W_t$ the bogie distance; i.e., the distance between the forward rear axle and the rearmost rear axle.

In the relationship referred to below between chassis height and axle distance, the calculations of chassis height are done at the wheel axles. As the air bellows and the level sensors are not always situated exactly at the wheel axle, the values used in the calculation are compensated so that they correspond to the values at the respective wheel axles. The advantage of this is that a general formula can be used for all types of vehicle, irrespective of type of bogie, positions of air bellows etc. The specific values for each type of vehicle are stored at a suitable location; e.g., in a control unit.

When the vehicle tilts forwards; e.g., because of air having been released from the air bellows of the front axle, the height $H_f$ will decrease. This causes the frame to rotate about the upper fastening to the air bellows of the forward rear axle; i.e., the height $H_b$ remains constant while at the same time the height $H_t$ will increase. Depending inter alia on the height $H_b$ before the tilting is initiated, the magnitude of the tilt and the wheelbase of the vehicle, the result may be that the maximum permissible value for the height $H_t$ is exceeded, which may result in mechanical damage to the vehicle.

To prevent the maximum permissible value for the height Ht being exceeded without an extra level sensor being fitted at the rearmost rear axle, the control unit may calculate the value for the height $H_t$ and thereby limit the tilt of the vehicle so that the maximum permissible value for the height Ht is not exceeded. The relationship between the heights $H_f$, $H_b$ and $H_t$ is derived from the following equation:

$$\frac{(Hb - Hf)}{Wb} = \frac{(Ht - Hf)}{(Wb + Wt)} \quad (1)$$

$H_t$ is extracted from equation (1) to produce the following equation:

$$Ht = \left(1 + \frac{Wt}{Wb}\right) * (Hb - Hf) + Hf \quad (2)$$

Hf=chassis at the at the front axle
Hb=chassis height at the forward rear axle
Ht=chassis height at the rearmost rear axle
Wb=distance between the front axle and forward rear axle
Wt=distance between the forward rear axle and the rearmost rear axle In a first embodiment of the device according to the invention, decrease in chassis height at the front axle is limited by being stopped when the height $H_t$ reaches a predefined maximum permissible value. This means that the evacuation of air from the air bellows at the front axle will be stopped; e.g., by closure of the solenoid valve which lets the air out. The driver can then, if necessary, reduce the bogie height manually in order thereafter to continue reducing the chassis height at the front axle.

In a second embodiment of the device according to the invention, the height $H_b$ also decreases when the chassis height at the front axle decreases, so that the height $H_t$ is not exceeded. This means that when the maximum permissible value of $H_t$ is reached, the system also begins to evacuate air from the air bellows at the forward rear axle. This is to prevent the height $H_t$ of being exceeded.

In a third embodiment of the device according to the invention, the height $H_b$ also decreases when the chassis height at the front axle decreases, so that the height $H_t$ is not exceeded. In this embodiment, air is evacuated simultaneously from the air bellows both at the front axle and at the forward rear axle so that the height $H_t$ remains constant. This means that the height $H_t$ is not exceeded.

The device here described is advantageously integrated in an electronically controlled air suspension (ECS) system existing in the vehicle. The advantage of integrating the device in an existing air suspension system is that the latter will be simplified and/or improved depending on its construction.

The device according to the invention may also be used with advantage on, for example, vehicles with three bogie axles. In this case, the chassis height $H_b$ is measured at the forward rear axle. The height $H_t$ corresponds to the chassis height at the rearmost rear axle. The distance $W_t$ then corresponds to the distance between the forward rear axle and the rearmost rear axle. In this case the control unit may also, when necessary, evacuate air from the air bellows of the middle wheel axle.

The device according to the invention may also be used with advantage on, for example, vehicles with two front axles. In such cases the chassis height $H_f$ is measured at the forward front axle. The height $H_b$ corresponds to the chassis height at the foremost rear axle. The height $H_t$ corresponds to the chassis height at the rearmost rear axle. The distance $W_b$ then corresponds to the distance between the forward front axle and the forward rear axle. In such cases the control unit may also, when necessary, evacuate air from air bellows of other wheel axles.

The invention is not to be regarded as limited to the embodiment examples described above, since a series of further variants and modifications are conceivable within the scopes of the claims set out below. For example, the method according to the invention may also be used for measuring axle pressure on rail-mounted air-sprung vehicles.

What is claimed is:

1. A device for calculating chassis height of a vehicle with at least three air-suspended wheel axles including a forward axle (2), a forward rear axle (3), and a rearmost axle (4), said device comprising:
   a control unit and two level sensors (9, 10) wherein said control unit is configured:
   (i) to detect the chassis height at the forward axle (2) via a first of the two level sensors (9);
   (ii) to detect the chassis height at the forward rear axle (3) via a second of the two level sensors (10); and
   (iii) to calculate the chassis height at the rearmost wheel axle (4) based on the detected chassis height at the forward axle (2) and the forward rear axle (3).

2. The device as recited in claim 1, wherein the control unit is further configured to limit the chassis height at the rearmost wheel axle (4) to a predefined maximum value when the vehicle's chassis height is adjusted.

3. The device as recited in claim 1, wherein the control unit is further configured to limit the chassis height at the front axle (2) on the basis of the chassis height at the rearmost wheel axle (4) when the vehicle's chassis height is adjusted.

4. The device as recited in claim 1, wherein the control unit is further configured to reduce the chassis height at the forward rear axle (3) when the chassis height at the front axle (2) decreases, so that a predefined maximum chassis height at the rearmost wheel axle (4) is not exceeded.

5. The device as recited in claim 1, wherein the device is integrated in an electronically controlled air suspension (ECS) system existing in the vehicle.

6. The device as recited in claim 1, wherein said device is incorporated into a vehicle.

7. A method for calculating chassis height of a vehicle which has at least three wheel axles including a forward axle, a forward rear axle, and a rearmost axle, said method comprising: detecting the chassis height at the vehicle's foremost wheel axle by means of a detector; detecting the chassis height at the vehicle's foremost rear wheel axle by means of a detector; and calculating the chassis height at the vehicle's rearmost wheel axle based on the detected chassis height at the forward axle and the forward rear axle.

8. The method as recited in claim 7, further comprising: permitting the control unit to limit the chassis height at the rearmost wheel axle to a predetermined maximum value when the chassis height is adjusted.

9. The method as recited in claim 7, further comprising: permitting the control unit to limit the chassis height at the front axle of the vehicle when the chassis height is adjusted when the chassis height at the rearmost wheel axle corresponds to a predefined maximum value.

10. The method as recited in claim 8, further comprising: permitting the control unit to reduce the chassis height at the forward rear axle when the chassis height at the front axle decreases, so that the predefined maximum chassis height at the rearmost wheel axle is not exceeded.

11. The method as recited in claim 7, wherein said method is executed by a computer as a computer program comprising program code embodying the steps of the method.

12. A computer program product comprising program code stored on a computer-readable medium that when executed by a computer calculates chassis height of a vehicle which has at least three wheel axles, including a forward axle, a forward rear axle, and a rearmost axle, by detecting the chassis height at the vehicle's foremost wheel axle by means of a detector; by detecting the chassis height at the vehicle's foremost rear wheel axle by means of a detector; and then calculating the chassis height at the vehicle's rearmost wheel axle based on the detected chassis height at the forward axle and the forward rear axle.

* * * * *